United States Patent Office 3,471,374
Patented Oct. 7, 1969

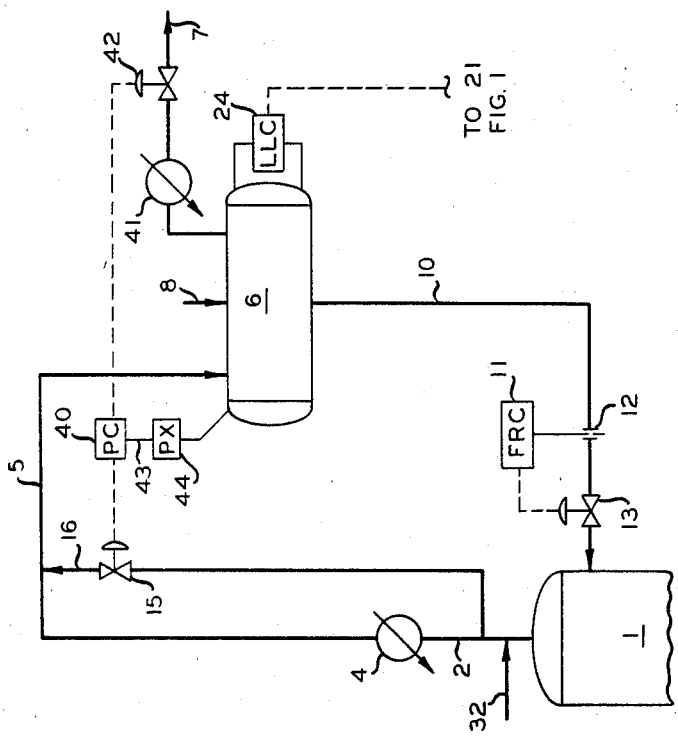
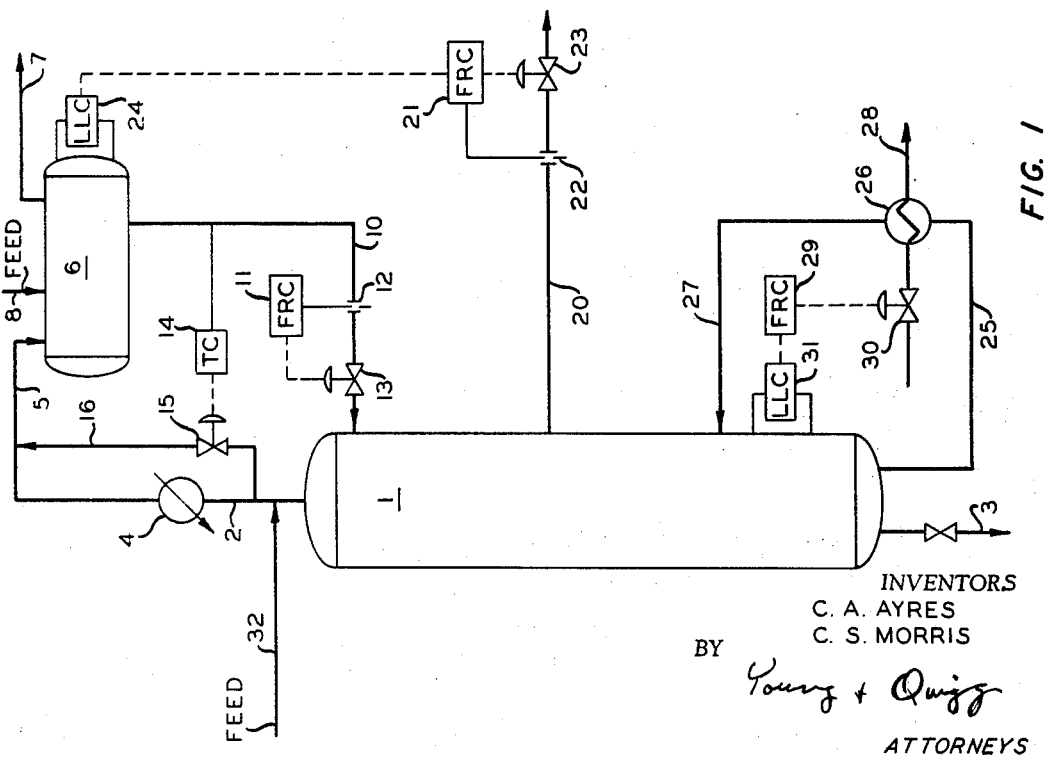

3,471,374
INTRODUCING THE FEED TO A DISTILLATION
ZONE MIXED WITH THE REFLUX
Charles A. Ayres and Carl S. Morris, Bartlesville, Okla.,
assignors to Phillips Petroleum Company, a corporation
of Delaware
Continuation-in-part of application Ser. No. 539,925,
Apr. 4, 1966. This application Oct. 30, 1967, Ser.
No. 678,783
Int. Cl. B01d 3/42
U.S. Cl. 203—2                                6 Claims

ABSTRACT OF THE DISCLOSURE

A method for operating a fractionation zone wherein the feed for said fractionation zone is passed into an overhead accumulation zone for said fractionation zone and a mixture of feed and overhead product from said accumulation zone is passed into said fractionation zone as the operating feed therefor, at least one intermediate product being withdrawn from said fractionation zone in response to the liquid level in said accumulation zone.

This is a continuation-in-part of U.S. application Ser. No. 539,925, filed Apr. 4, 1966 now abandoned.

This invention relates to a method for fractionating a material composed of at least two separatable components.

Heretofore in fractionating a material composed of a plurality of components it has been difficult to operate the fractionation column continuously at optimum conditions primarily because the feed material passed into the fractionation column does not have a constant flow rate, i.e. continuously varies from maximum to minimum flow rates, and thereby prevents the maintenance of optimum fractionation conditions in the column. Many involved and expensive schemes have been proposed which theoretically would allow the operation of a fractionation column continuously at optimum conditions. However, a large number of these schemes did not meet expectations and others which did meet expectations did not prove to be practical.

It has now been found that a fractionation zone can be simply and dependably operated under substantially constant optimum feed flow rate conditions, even though the flow rate of the actual feed for that fractionation zone varies substantially, if the feed for the fractionation zone is passed directly into at least one of the overhead condensed vapor accumulation zone for that fractionation zone and the overhead vapor line that carries overhead material from the top of that fractionation zone to the overhead condensed vapor accumulation zone, the feed that is then passed into the fractionation zone being a mixture of feed and overhead product which is withdrawn from the accumulation zone at a substantially constant flow rate, and if the rate of removal of at least one product from the fractionation zone is controlled in response to the liquid level in the accumulation zone.

Thus, by this invention the feed to the fractionation zone is a mixture of overhead product and feed for the fractionation zone. This mixture is passed into the fractionation zone at a substantially continuous, optimum rate, this being possible since the mixture is supplied by an accumulation zone. Thus, flow rate variances in the actual feed flow rate are leveled out at a plane equal to the optimum flow rate for feed to the fractionation zone. To insure that there is always an ample source of material available in the accumulation zone so that the desired constant flow rate of feed into the fractionation zone can always be maintained the same, the rate of withdrawal of product from the fractionation zone is based on the liquid level in the accumulation zone so that if, for example, the liquid level in the accumulation zone reaches a minimum desirable point below which a constant flow rate of feed into the fractionation zone cannot be maintained, the rate of withdrawal of product from the fractionation zone is decreased so that more overhead product from the fractionation zone passes to the accumulation zone until the liquid level in the accumulation zone reaches the desired safe level for constant feed flow.

Accordingly, it is an object of this invention to provide a new and improved method for operating at least one fractionation zone substantially continuously at optimum operating conditions for the particular component separation desired to be made in that fractionation zone.

Other aspects, objects, and the several advantages of this invention will be apparent to those skilled in the art from the description, drawings, and appended claims.

FIGURES 1 and 2 show two systems embodying this invention.

In FIGURE 1 there is shown a conventional fractionation zone (fractionator) 1 from which lower boiling components of the feed are removed as overhead vapors through line 2 and higher boiling components are removed as bottom product through valved line 3. The normally vaporous overhead product is normally passed through cooler (condenser) 4 and then through line 5 into accumulation zone (accumulator) 6.

Instead of passing the actual feed directly into fractionator 1, as is conventional, this feed is passed directly into accumulator 6 through line 8, or directly into overhead line 2 through line 32.

Thus, the material withdrawn from the bottom of accumulator 6 through line 10 is composed of a mixture of actual feed for fractionator 1 and condensate obtained from cooling the overhead vapors of fractionator 1. It is this mixture of actual feed and condensed reflux that is passed into fractionator 1 as operational feed. The rate of flow of this mixture into fractionator 1 is maintained substantially constant by flow recorder controller 11 which is operatively connected to a flow sensing means 12 and a motor valve 13.

Vapors are vented from accumulator 6 through line 7 and cooled to condense higher boiling materials. The condensate is returned to the accumulator and the remaining vapors removed from the system.

Besides keeping the rate of flow of feed and reflux into fractionator 1 at a substantially constant optimum level, the temperature of this mixture is also maintained at a substantially constant, optimum temperature level by temperature controller 14 which is operatively connected to line 10 and to motor valve 15 and bypass line 16. Thus, if the temperature of the mixture in line 10 falls below the minimum temperature necessary to maintain the operating conditions of fractionator 1 at the desired optimum level temperature controller 14 will open or further open motor valve 15 thereby passing some or all hot overhead vapors from fractionator 1 around condenser 4 and into accumulator 6 to raise the temperature of the mixture present in accumulator 6.

A sidecut product material is removed from fractionator 1 through line 20 in a conventional manner. Flow recorder controller 21 is operatively connected to a flow sensing means 22 and motor valve 23 downstream in line 20. Thus, flow recorder controller 21 will maintain the rate of withdrawal of product through line 20 substantially constant at any desired rate. However, flow recorder controller 21 is also operatively connected to liquid level controller 24 on accumulator 6. Thus, if the liquid level in accumulator 6 varies above a desired maximum or below a desired minimum, flow recorder controller 21 will be reset by liquid level controller 24 and will in turn adjust motor valve 23 in accordance with its new set point. The adjustment of motor valve 23 will be reflected in the amount of overhead removed from fractionator 1 and passed into accumulator 6 and will thereby affect the liquid level in that accumulator. For example, if the liquid level in accumulator 6 falls below a minimum desired value this will cause liquid level controller 24 to reset the set point of flow recorder controller 21 in a manner which causes flow recorder controller 21 to pinch down on motor valve 23 and thereby reduce and maintain reduced the rate of removal of product through line 20 from fractionator 1. This reduced rate of removal of product through line 20 will cause retention of more material in fractionator 1, which in turn will cause the production of more overhead vapor and the passage of that fluid into accumulator 6 to raise the liquid level therein back to a safe and desirable level.

Some bottom product is removed from fractionator 1 through line 25, heated in reboiler 26, and returned to fractionator 1 by line 27. Heating fluid is passed through reboiler 26 by line 28 and the rate of flow of heating fluid, e.g. steam, through line 28 is controlled by flow recorder controller 29 which is operatively connected to motor valve 30 in line 28 and liquid level controller 31 of fractionator 1. Thus, if the liquid level in the bottom of fractionator 1 exceeds a predetermined maximum the set point on flow recorder controller 29 will be reset by liquid level controller 31 so as to further open motor valve 30 thereby allowing bottom product passing through reboiler 26 to be heated more than before thereby, in effect, increasing the heat input to fractionator 1.

FIGURE 2 represents the same apparatus as FIGURE 1 except that temperature controller 14 is omitted, pressure controller 40 is substituted therefor, and condenser 41 and valve 42 are added to line 7. Pressure controller 40 is connected through line 43 and pressure transmitter 44 to the interior of the accumulation zone 6. Thus, the bypassing of hot overhead material from fractionator 1 through line 16 is controlled in response to the pressure in accumulator 6 and the amount of vapor vented from accumulator 6 through line 7 is also controlled in response to the pressure in accumulator 6. Condenser 41 is employed in line 7 to condense residual condensible materials from the vapors removed from accumulator 6 before the vapors are removed from the system through line 7.

In operation, the pressure in accumulator 6 is sensed and a signal corresponding to the pressure is transmitted by pressure transmitter 44 through line 43 to pressure controller 40. For example, if the pressure in accumulator 6 is desired to be fixed at a predetermined value, this value corresponds to a given signal from transmitter 44 and is used as a set point for pressure controller 40. Pressure controller 40 is a conventional split range controller which is commercially available. When the pressure in accumulator 6 exceeds the desired pressure therein pressure controller 40 can close or at least partially close valve 15 and open or at least partially open valve 42. When the pressure in accumulator 6 is below the predetermined desired pressure for that accumulator, pressure controller 40 can open or at least partially open valve 15 and close or at least partially close valve 42. When the predetermined desired pressure is arrived at in accumulator 6, pressure controller 40 will balance the openings in valves 15 and 42, including closing one or both of those valves, so as to add vapors to accumulator 6 through line 5 and remove vapors from accumulator 6 through line 7 in a manner such that the predetermined desired pressure in accumulator 6 is substantially maintained.

This invention is applicable to substantially any fractionatable material be it organic, inorganic, or a mixture thereof. For example, this invention can be applied to the separation of one or more lower boiling alcohols or one or more higher boiling components, e.g. liquid polymers, esters, and the like. The invention is also suited for the separation of one or more hydrocarbons from a mixture of hydrocarbons. For example, one or more of the higher boiling hydrocarbons present in a mixture of hydrocarbons containing from 1 to 20 carbon atoms per molecule, inclusive, can be separated from the remainder of the mixture by this invention.

Example

A feed material comprising 21 pounds methane, 8,832 pounds ethylene, 1,308 pounds ethane, 1,901 pounds butene-1, 125,319 pounds isobutane, 12 pounds hydrogen, and 2 pounds polyethylene (all pounds herein being based on a standard day) and at a temperature of 110° F. is passed through line 8 into accumulator 6 which is maintained at a temperature of about 100° F. A mixture containing the above feed and also overhead condensed vapors is removed from accumulator 6 through line 10 and passed into fractionator 1 at about 100° F. and at a substantially constant flow rate of 40 gallons per minute. The flow rate of feed passing into accumulator 6 through line 8 will vary widely, e.g. from less than 1 to more than 3 gallons per minute but the flow rate of mixture through line 10 is maintained substantially constant at 40 gallons per minute. Overhead vapors comprising 21 pounds methane, 8,814 pounds ethylene, 1,249 pounds ethane, 60 pounds butene-1, 570 pounds isobutane, and 12 pounds hydrogen are removed from fractionator 1 at a temperature of about 168° F., cooled to a temperature of about 100° F. in condenser 4, and then passed substantially at that temperature into accumulator 6. If the temperature of the mixture in line 10 falls substantially below 100° F. temperature controller 14 opens motor valve 15 and allows at least part of the overhead product in line 2 to bypass condenser 4 and flow into accumulator 6 until the temperature of the mixture in line 10 again approaches substantially 100° F.

The sidecut product removed through line 20 comprises 18 pounds ethylene, 59 pounds ethane, 1,841 pounds butene-1, and 124,689 pounds isobutane. The sidecut product passes through line 20 at about 575 cubic feet per minute. Flow recorder controller 21 has a set point which will cause the reset in the opening of motor valve 23 so that this normal flow rate is maintained substantially at that value. Flow recorder controller 21 will vary in response to the liquid level in accumulator 6 as described hereinabove.

Bottom product comprising 60 pounds isobutane and 2 pounds polyethylene is removed at about 273° F.

Resonable variations and modifications are possible within the scope of this disclosure without departing from the spirit and scope thereof.

We claim:

1. A method for operating a fractionation zone under substantially constant, optimum feed flow rate conditions notwithstanding substantial variations in the flow rate of the actual feed for said fractionation zone; comprising providing a zone for accumulating condensed overhead vapors from said fractionation zone; passing the feed for said fractionation zone directly into at least one of said accumulation zone and the conduit for carrying overhead vapors from said fractionation zone to said accumulation zone; maintaining the temperature of the mixture of feed and overhead product removed from said accumulation zone substantially constant by by-passing, if needed, at least a portion of hot overhead product around any cooling zone and into said accumulation zone in response to a physical condition in said accumulation zone; removing a mixture of feed and overhead product from said accumulation zone at a substantially constant flow rate and passing same into said fractionation zone as the operating feed therefor; removing at least one intermediate distillate product from said fractionation zone between the reflux and bottoms of said fractionation zone; and controlling the rate of withdrawal of at least one of said at least one intermediate distillate product in response to the liquid level in said accumulation zone, said rate of withdrawal of said at least one intermediate distillate product being controlled so that it increases when the liquid level in said accumulation zone exceeds a predetermined maximum level and decreases when the liquid level in said accumulation zone falls below a predetermined minimum level.

2. The method according to claim 1 wherein said at least a portion of hot overhead product is passed around any cooling zone and into said accumulation zone in response to the temperature of said mixture of feed and overhead product issuing from said accumulation zone.

3. The method according to claim 1 wherein said fractionation zone contains a bottoms zone wherein higher boiling materials collect in a substantially liquid state; wherein a portion of said materials is removed from said bottoms zone, heated, and returned to said fractionation zone; and wherein the extent to which said portion of materials is heated is controlled by the liquid level in said bottoms zone, said portion of liquid materials being heated to a greater extent when the liquid level in said bottoms zone increases above a predetermined maximum level due the retention of material in said fractionation zone which retention is caused by a decrease in the rate of withdrawal of said at least one of said at least one product, and said portion of liquid materials being heated to a lesser extent when the liquid level in said bottoms zone decreases below a predetermined minimum level due to the removal of material from said fractionation zone which removal is caused by an increase in the rate of withdrawal of said at least one of said at least one product.

4. The method according to claim 1 wherein said actual feed is composed of a preponderance of isobutane, the remainder being substantially all methane, ethane, ethylene, butene-1, hydrogen, and polymer, said at least one product whose rate of withdrawal is controlled in response to the liquid level in said accumulation zone is composed of a preponderance of isobutane, the remainder being substantially all ethylene, ethane, and butene-1, and said condensed overhead vapors are obtained from cooling a vaporous mixture composed of a preponderance of ethylene, the remainder being substantially all methane, ethane, butene-1, isobutane, and hydrogen to a temperature substantially below about 168° F., and said actual feed is introduced primarily into said conduit for carrying overhead vapors from said fractionation zone to said accumulation zone.

5. The method according to claim 1 wherein said at least a portion of hot overhead product is passed around any cooling zone and into said accumulation zone in response to the pressure in said accumulation zone.

6. The method according to claim 5 wherein said portion of hot overhead product is passed around any cooling zone when the pressure in said accumulation zone falls below a predetermined minimum value.

References Cited

UNITED STATES PATENTS

| | | | |
|---|---|---|---|
| 2,666,019 | 1/1954 | Winn et al. | 208—351 |
| 2,775,103 | 12/1956 | Koble et al. | 208—351 |
| 2,813,594 | 11/1957 | Gantt | 203—2 |
| 2,868,701 | 11/1959 | Berger | 202—160 |
| 2,900,312 | 8/1959 | Gilmore | 202—160 |
| 2,990,437 | 6/1961 | Berger | 208—351 |

HERBERT LEVINE, Primary Examiner

U.S. Cl. X.R.

62—21, 28; 196—141; 208—350, 351